(12) United States Patent
Püschner et al.

(10) Patent No.: US 10,061,292 B2
(45) Date of Patent: Aug. 28, 2018

(54) METHOD FOR ALIGNING A STRIP OF LABELS

(71) Applicant: KRONES AG, Neutraubling (DE)

(72) Inventors: Armin Püschner, Regensburg (DE); Markus Weiss, Alteglofsheim (DE)

(73) Assignee: KRONES AG, Neutraubling (DE)

( * ) Notice: Subject to any disclaimer, the term of this patent is extended or adjusted under 35 U.S.C. 154(b) by 245 days.

(21) Appl. No.: 14/766,091

(22) PCT Filed: Jan. 16, 2014

(86) PCT No.: PCT/EP2014/050777
§ 371 (c)(1),
(2) Date: Aug. 5, 2015

(87) PCT Pub. No.: WO2014/124775
PCT Pub. Date: Aug. 21, 2014

(65) Prior Publication Data
US 2015/0370240 A1    Dec. 24, 2015

(30) Foreign Application Priority Data

Feb. 14, 2013  (DE) .................. 10 2013 202 425

(51) Int. Cl.
*G05B 19/042*    (2006.01)
*G05B 19/402*    (2006.01)
(Continued)

(52) U.S. Cl.
CPC .......... *G05B 19/402* (2013.01); *B65C 9/1803* (2013.01); *B65C 9/44* (2013.01);
(Continued)

(58) Field of Classification Search
USPC ........................................................ 700/114
See application file for complete search history.

(56) References Cited

U.S. PATENT DOCUMENTS

| 6,112,658 A | 9/2000 | Gunther et al. |
| 2012/0055297 A1 | 3/2012 | Pedercini et al. |
| 2013/0205964 A1* | 8/2013 | Matsushita ............. B65C 3/065 83/80 |

FOREIGN PATENT DOCUMENTS

| DE | 4026250 C2 | 12/1992 |
| DE | 4409195 C2 | 8/1996 |

(Continued)

OTHER PUBLICATIONS

German Search Report for Application No. 102013202425.8, dated Jun. 6, 2013.

(Continued)

*Primary Examiner* — Mohammad Ali
*Assistant Examiner* — Joshua Sanders
(74) *Attorney, Agent, or Firm* — Marshall, Gerstein & Borun LLP

(57) ABSTRACT

A method for aligning a strip of labels, which contains a plurality of labels, relative to a cutting device, wherein the strip of labels is cut into labels by the cutting device that are subsequently applied to containers. In a learning mode, the strip of labels is automatically transported by a transport device and the position of the strip of labels relative to the cutting device is detected by a position sensor disposed as a first camera, and, in an aligning mode, an operator can then enter a desired cutting parameter in a machine control unit of an input unit. Information indicated of the desired cutting parameter relative to the strip of labels is then displayed to the operator on a screen, and the machine control unit controls the cutting device on the basis of the desired cutting parameter.

11 Claims, 3 Drawing Sheets

(51) Int. Cl.
  *B65C 9/18* (2006.01)
  *B65C 9/44* (2006.01)
  *B65C 9/40* (2006.01)
(52) U.S. Cl.
  CPC ............... *B65C 2009/404* (2013.01); *G05B 2219/49372* (2013.01)

(56) References Cited

FOREIGN PATENT DOCUMENTS

| | | | |
|---|---|---|---|
| DE | 202005020478 U1 | | 5/2007 |
| DE | 102009035924 A1 | | 2/2011 |
| EP | 2364918 A2 | | 9/2011 |
| JP | 2007076671 A | * | 3/2007 |
| JP | 2007076671 A | | 3/2007 |
| JP | 2011062985 A | | 3/2011 |
| WO | WO-2010/103441 A2 | | 9/2010 |

OTHER PUBLICATIONS

International Search Report for Application No. PCT/EP2014/050777, dated Apr. 10, 2014.

* cited by examiner

METHOD FOR ALIGNING A STRIP OF LABELS

CROSS-REFERENCE TO RELATED APPLICATION

The present application is the US national phase of International Patent Application No. PCT/EP2014/050777, filed Jan. 16, 2014, which application claims priority to German Application No. 102013202425.8, filed Feb. 14, 2013. The priority application, DE 102013202425.8, is hereby incorporated by reference.

FIELD OF THE DISCLOSURE

The invention relates to a method for aligning a strip of labels, and a labeling machine for labeling containers.

BACKGROUND

In labeling machines, labels are applied to containers. In the process, an uncut strip of labels is unwound from a supply roller and supplied to a cutting device by means of a transport device with several rollers. In the cutting device, the strip of labels is then taken up by a vacuum roller and cut into individual labels with a cutter. The individualized labels are taken off the vacuum roller by a gripping mechanism, provided with glue at a gluing station and applied to containers.

For a precise cutting position in the cutting device, the strip of labels is usually provided with cutting marks that are embodied as highly contrasting color bars on the strip of labels. The strip of labels is passed by a position sensor in the cutting device at high speed, which sensor detects the cutting marks at a high time resolution and then emits a signal to the control unit of the cutting device. By this signal, the cutter is controlled with respect to the position of the strip of labels such that the latter is cut into individual labels at the desired cutting positions.

Moreover, a method is known from EP 2 364 918 A2 which can do without the above mentioned cutting marks. In said method, two-dimensional images of the strip of labels are taken with an image acquisition unit, and by detection of the label print, a clock signal is then generated for the cutting device.

A disadvantage in the mentioned prior art is that the well-known method is prone to errors during the learning and aligning of a strip of labels and takes a long time because an operator must manually perform a sequence of functions required for this, such as, for example, the feed motion of the strip of labels or the vacuum in the cutting device.

OBJECT OF THE INVENTION

It is the object of the present invention to provide a method for aligning a strip of labels that is less prone to errors and can be performed more quickly.

SUMMARY OF THE DISCLOSURE

The invention achieves this object in a method for aligning a strip of labels wherein, in a learning mode, the strip of labels is automatically transported with a transport device, and the position of the strip of labels relative to the cutting device is detected by means of a position sensor embodied as a first camera, and, in an aligning mode, an operator can then enter a desired cutting parameter in a machine control unit by means of an input unit, wherein the desired cutting parameter relative to the strip of labels is then displayed to the operator on a screen, and wherein the machine control unit then controls the cutting device on the basis of the desired cutting parameter.

By the strip of labels being automatically transported by a transport device in a learning mode, the position sensor embodied as a first camera may automatically detect the strip of labels along the direction of transport. Thereby, a region of the strip of labels with a plurality of labels disposed sequentially one after another may be detected in a camera image. Moreover, by the known distance of the position sensor to the cutting device, a fixed relation may be established, and the position of the strip of labels relative to the cutting device may be determined.

By the operator being able to enter the desired cutting parameter into the machine control unit with the input unit and the latter being displayed on the screen relative to the strip of labels, the operator may then enter the desired cutting parameter for the cutting device such that it comes to lie at the desired position, for example the border between two labels. Since the position of the strip of labels relative to the cutting device is already known from the learning mode, with this knowledge, the desired cutting parameter may be employed for controlling the cutting device. In other words, a fixed correlation between the image of the strip of labels and the desired cutting parameter is given on the screen image, and an operator may correspondingly shift it with respect to the image of the strip of labels such that the desired cutting position for individualizing the labels may be entered.

In the method according to the invention, the functions may be performed automatically within the learning mode, and in the aligning mode, only the indication of the desired cutting parameter by the operator is required. Thereby, a particularly simple alignment of the strip of labels results, for example during the change to a new type of labels.

The method may be provided for a labeling machine. The labeling machine may be embodied to label containers with labels, the containers in particular being plastic bottles, glass bottles, cans and/or tubes. The containers may be provided for beverages, food, sanitary products, pastes, chemical, biological and/or pharmaceutical products. The labels may in particular be labels which are applied with an adhesive agent. The labels may in particular be blanks of paper or plastic which in particular comprise a print designating, describing and/or advertising the contents of the container. The labels may be disposed sequentially one after another on the strip of labels. The strip of labels may be a tape or a hose.

The cutting device may comprise at least one knife-type tool for cutting the strip of labels. The cutting device may comprise a vacuum roller by which the strip of labels is transported and/or fixed before and after cutting.

The transport device may be embodied with a plurality of deflection rollers and/or drive rollers to transport the strip of labels. The transport device may be connected to the machine control unit for controlling it.

The first camera may be embodied to detect a region of the strip of labels on which a plurality of labels is disposed in the direction of transport. In the position sensor or the machine control unit, parameters may be stored by which the position of the strip of labels relative to the cutting device may be calculated. A parameter may in particular be a distance between the position sensor and the cutting device.

The learning mode may be activated by a key or the input unit. Moreover, the position sensor and/or the machine control unit may be embodied to detect a new label, the learning mode being automatically activated in particular in case of a new type of label. With the learning mode, a new type of label for the position sensor and/or the machine control unit may be learned. A new type of label can mean that the operating parameters required for the control of the labeling machine for this type of label are not yet stored in the control unit.

The input unit may be embodied as a keyboard, arrow keys and/or as a touch screen. The input unit may be connected to the machine control unit. The screen may be embodied in a touch-sensitive manner as an input unit. The screen may be connected to the machine control unit. The screen may be embodied to graphically display the strip of labels and the desired cutting parameter.

Desired cutting parameter can mean that this is a parameter desired by the operator for the cutting device which indicates the desired cutting position relative to the strip of labels.

The machine control unit may be embodied to control the cutting device and/or the transport device, in particular for automatically controlling the transport device when aligning the strip of labels. The machine control unit may be embodied to control the cutting time of the cutting device via a clock cycle. The machine control unit may comprise at least one motor control for controlling the transport device and/or the cutting device. The machine control unit may be subdivided into several control and/or detection modules which are correspondingly assigned to the transport device or the cutting device, respectively. The control and/or detection modules may be interconnected via a data bus. A control and/or detection module of the machine control unit may be disposed in the position sensor.

In the method, the desired cutting parameter may be stored in a database. Thereby, the desired cutting parameter may be retrieved from the database when the same type of label is used at a later time. The desired cutting parameter may be stored in the database together with at least one identification feature of the type of label. The database may be connected to the machine control unit.

In the method, the camera images of the position sensor may be evaluated with a first image-processing unit. Thereby, features from the camera image of the strip of labels may be automatically identified. For example, bar codes, printed margins, text, characteristic curve progressions and corners may be automatically detected with the image-processing unit. Thereby, the operator may be supported in the positioning of the desired cutting parameter by marking characteristic features on the screen. Moreover, with the image-processing unit, identification features of the type of label may be evaluated and detected. The first image-processing unit may be disposed in the machine control unit and/or the first camera.

In the method, in the learning mode, the first image-processing unit may automatically detect an actual cutting parameter and mark it on the screen relative to the strip of labels. Thereby, the actual cutting parameter may be displayed on the screen as a suggestion for a desired cutting parameter. Thereby, the operator may enter the desired cutting parameter more quickly, whereby the setting up of a new label is accelerated. Actual cutting parameter may mean that this is a parameter automatically determined by the first image-processing unit for the cutting device by means of which a cutting position relative to the strip of labels is suggested to the operator.

The actual cutting parameter may be stored in a database in the method. Thereby, a later analysis of the performance of the first image-processing unit is possible, and criteria for improving the first image-processing unit may be derived thereby. The database may be the same as the above described database for storing the desired cutting parameter.

In the method, a quality assurance unit embodied as a second camera may detect the cut strip of labels in a quality assurance mode. This enables the operator to view the camera image of the second camera and to check the actual cutting position. Cutting position can mean that this is the actual position at which the strip of labels was cut by the cutting unit. With an incorrect cutting position, the operator may then correct the desired cutting parameter until the cutting position is correct. The operator may mark the cutting position with the aid of the input unit and the strip of labels displayed at the screen for evaluation. The first camera and the second camera may be one single camera or two different cameras.

In the method, the quality assurance unit may automatically detect a cutting position at the cut strip of labels with the aid of a second image-processing unit and display it on the screen relative to the strip of labels. Thereby, the quality assurance unit is automated, and it takes particularly little time for the operator to correct the desired cutting parameter, if necessary. The first image-processing unit and the second image-processing unit may be one single image-processing unit or two different image-processing units. The second image-processing unit may be disposed in the machine control unit and/or the second camera.

In the method, the machine control unit may automatically correct a deviation from the desired cutting parameter of the cutting position in a correction mode. Thereby, the correction of the desired cutting parameter is automated and does not require any intervention by the operator. By the deviation, the distance between the position sensor and the cutting device may be calibrated. Equally, the cutting device may be calibrated by the deviation with respect to the cutting position.

In the method, the cutting position may be stored in a database. Thereby, the actual cutting position may be retrieved from the database at a later point in time, and the system may do without any further calibration.

Moreover, the invention provides a labeling machine for labeling containers, comprising a transport device for transporting a strip of labels with a plurality of labels, a cutting unit for cutting the strip of labels, a position sensor embodied as a first camera for detecting the position of the strip of labels relative to the cutting device, and a machine control unit with a screen and an input unit, characterized in that the input unit is embodied to enter and/or correct a desired cutting parameter, the screen being embodied to display the desired cutting parameter relative to the strip of labels, and a cutting position of the cutting device being controllable by the machine control unit on the basis of the desired cutting parameter.

By the input unit being embodied to enter and/or correct a desired cutting parameter, and due to the fact that it may be displayed on the screen relative to the strip of labels, it is possible for the operator to enter the desired cutting parameter with respect to the strip of labels at the desired point in a simple manner. By the cutting position of the cutting device being controllable by the machine control unit on the basis of the desired cutting parameter, the cutting device may be automatically controlled such that the cut is effected at the desired cutting parameter. Thereby, an operator may adapt the labeling machine to labeling with a new type of label particularly easily and quickly.

The labeling machine may comprise the features described above.

The labeling machine may furthermore comprise a first image-processing unit for evaluating the position of the strip of labels from a camera image of the position sensor. Thereby, the position of the strip of labels and/or characteristic features of the strip of labels may be automatically evaluated. By displaying such information, the operator may be well supported in the selection of the desired cutting parameter.

The first image-processing unit may be embodied to detect transformation-invariant features of the labels. Transformation-invariant features may be printing features that may be identified independently of a shifting of the strip of labels relative to the position sensor with the aid of the first image-processing unit. For example, these may be margins, bar codes, edges, corners, circles and/or centers of circles.

The first image-processing unit may be embodied to compare the camera image with a reference image. Thereby, the position of the strip of labels may be particularly easily determined. The first image-processing unit may be embodied, when comparing the camera image with the reference image, to calculate a transformation between both images. Comparison can mean that a shifting between the camera image and the reference image may be determined with the first image-processing unit.

The labeling machine may furthermore comprise a quality assurance unit for detecting the cut strip of labels. Thereby, the quality of the cut and/or the cutting position may be detected and evaluated by the cutting unit.

The quality assurance unit may comprise a second camera where a cutting position may be evaluated from a camera image of the cut strip of labels with a second image-processing unit. Thereby, the cutting position may be automatically detected downstream of the cutting device and consulted for a correction of the desired cutting parameter.

The labeling machine may in particular be embodied for the performance of the above-described method.

Further features and advantages of the invention will be illustrated below with reference to the embodiments represented in the figures. In the figures:

DETAILED DESCRIPTION OF THE PREFERRED EMBODIMENTS

Figure 1:
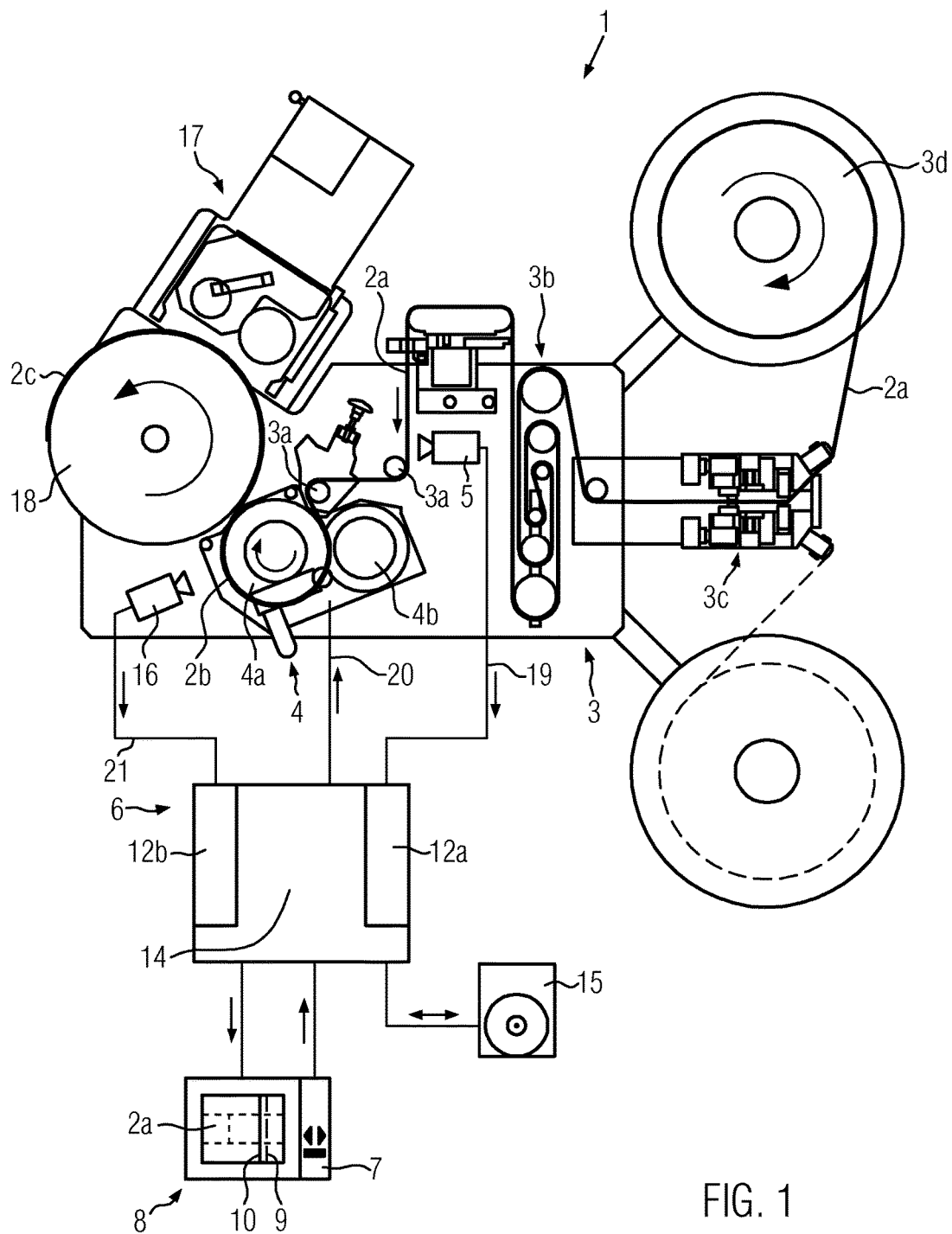
FIG. 1 shows a labeling machine according to the invention in a plan view.

FIG. 1 shows a labeling machine 1 according to the invention in a plan view. One can see that the strip of labels 2a is passed through the various units of the labeling machine 1 by the transport device 3. In the process, the strip of labels 2a is first passed by the position sensor 5 and cut into individual labels at the cutting device 4. Subsequently, the individual labels 2c are passed by the gluing station 17 and attached to containers with the transfer roller 18 (not represented here).

The transport device 3 comprises a supply roller 3d, a conglutination station 3c for conglutinating the strip of labels 2a at the occasion of a change of the supply roller 3d, a belt buffer 3b and several deflection rollers 3a. The transport device 3 guides and transports further the strip of labels 2a within the labeling machine 1.

The cutting device 4 comprises a vacuum roller 4a and a cutting tool 4b. Here, the initially uncut strip of labels 2a is fed to the cutting device 4 and fixed on the vacuum roller 4a by means of a vacuum. The cutting tool 4b has a plurality of vertically extending blades by which the strip of labels 2a may be cut into the individual labels 2c. The cutting device 4 is embodied to be controllable such that the cutting position may be varied along the direction of transport of the strip of labels 2a. Thereby, the cutting device 4 may be adapted to different label lengths such that the cutting position extends at the provided edges of the labels 2c.

However, since the position of the strip of labels 2a relative to the cutting device 4 is not known from the beginning, it is detected by the position sensor 5 which is disposed upstream of the cutting device 4. One can see that the position sensor 5 is embodied as a first camera and oriented with a perpendicular angle of view onto the strip of labels 2a. The field of view of the position sensor 5 detects a length of the strip of labels 2a which is larger than one individual label 2c. The images of the position sensor 5 are now transmitted to the first image-processing unit 12a via an image data line 19 and evaluated there. The first image-processing unit 12a is here integrally arranged in the machine control unit 6. As an alternative, it may also be arranged within the position sensor 5.

The first image-processing unit 12a is here embodied on the strip of labels 2a to detect characteristic features of the label print. For example, the edges of an individual label print are detected, and their positions relative to the position sensor 5 are determined. Moreover, in the position sensor 5, its distance to the cutting device 4 is stored. For example, this distance is the path of the strip of labels 2a in the conveying direction starting from the image's center of the camera image to a reference cutting position in the cutting device 4. This distance is once calibrated at the occasion of the commissioning of the labeling machine 1 and stored as a parameter, together with the width of the camera image in the plane of the strip of labels 2a, in the position sensor 5 or in the machine control unit 6. Consequently, the distance of a certain column in the camera image to the reference cutting position of the cutting device 4 may be calculated via these parameters. As described above, the position of the label edge is already detected by the first image-processing unit 12a, and the position of the strip of labels relative to the cutting device 4 may thus be directly calculated.

In the learning mode, the transport device 3 automatically passes the strip of labels 2a by the position sensor 5, and by the above-described procedure, the position of the strip of labels 2a relative to the cutting device 4 is automatically detected. The machine control unit 6 with the first image-processing unit 12a and the control module 14 for controlling the cutting device 4 takes care of the automatic control.

Figure 2:
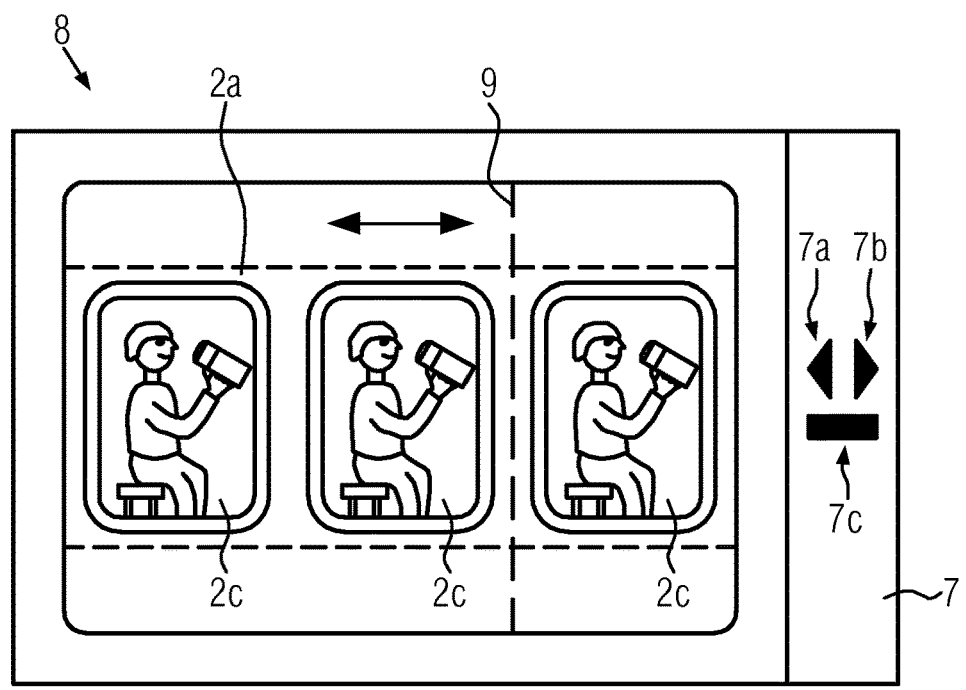
FIG. 2 shows a screen display of the strip of labels when the desired cutting parameter is entered with an input unit.
Figure 3:
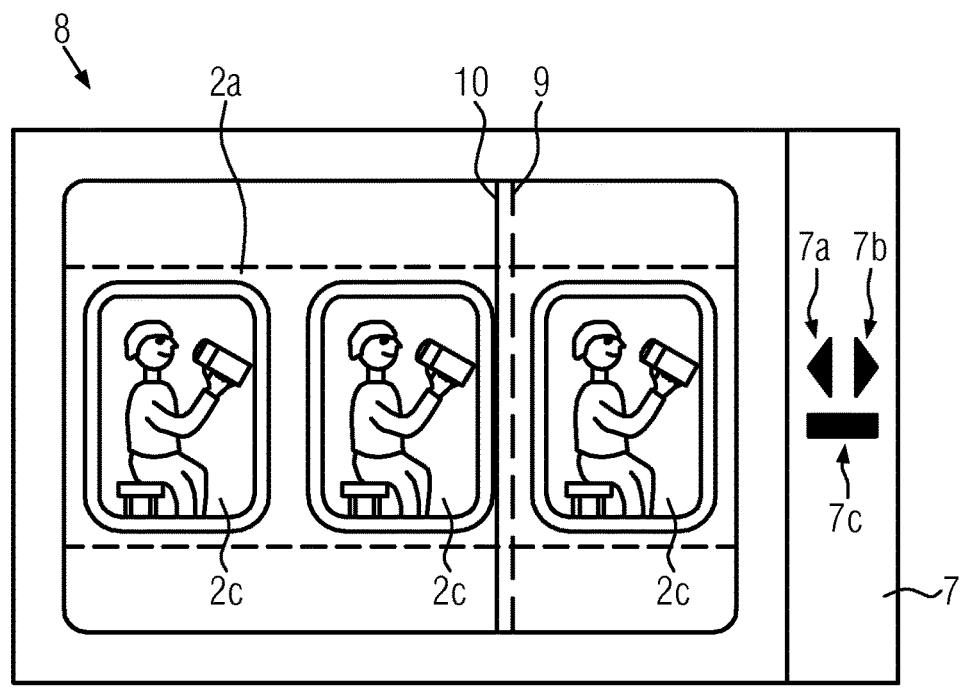
FIG. 3 shows a screen display during an automatic detection of the actual cutting parameter.
Figure 4:
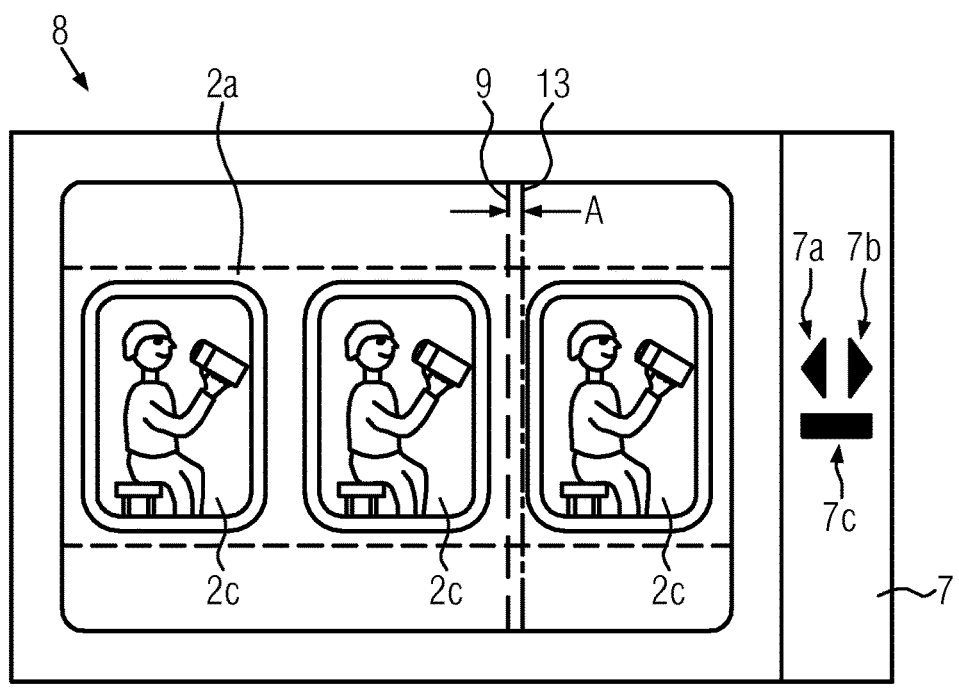
FIG. 4 shows a screen display after the detection of the cutting position by a quality assurance unit.

Subsequently, the camera image of the position sensor 5 is displayed on the screen 8 in the aligning mode. On the screen 8, the image of the strip of labels 2a, an automatically determined actual cutting parameter 10, and the desired cutting parameter 9 selected by the operator can be seen. This desired cutting parameter 9 may be entered or corrected by the operator through the input unit 7. This is illustrated in FIGS. 2-4 below.

Moreover, the quality assurance unit 16 is arranged in the region of the ejection of the cutting device 4. It is embodied as a second camera and detects the cut strip of labels 2b with its angle of view. The camera image is transmitted to the second image-processing unit 12b via the image data line 21. With the second image-processing unit 12b, the cutting position is automatically determined in the image of the cut strip of labels 2b. As indicated in FIG. 4, a correction of the desired cutting parameter may be effected in a correction mode thereby. Moreover, the operator may visually assess whether the cutting position is correctly selected.

Subsequently, the cut labels 2c are attached to containers (not shown here).

With the labeling machine 1 according to the invention, it is easily and quickly possible to teach a new type of label with the position sensor 5 and to predetermine the correct position of the desired cutting parameter for controlling the cutting device 4. It is equally possible to automatically correct, via the quality assurance unit 16 in the correction mode, a deviation of the desired cutting parameter 9 from the actual cutting position. With this information, a calibration of the distance of the position sensor 5 from the cutting device 4 may also be effected.

Moreover, the data determined in the method (e. g. actual and desired cutting parameters, cutting position and/or image data) are stored in the database 15 by the machine control unit 6. Thereby, a label type does not have to be taught again, calibration parameters may be stored, and the data may be consulted for later evaluation.

FIG. 2 shows a screen display of the strip of labels 2a during the entering of the desired cutting parameter 9 with the input unit 7.

On the screen 8, the image of the strip of labels 2a is represented which was taken with the first camera of the position sensor 5 of FIG. 1. The strip of labels 2a has several labels 2c with the represented prints. Moreover, the desired cutting parameter 9 is shown. It may be horizontally shifted along the double arrow with the input unit 7 via the arrow keys 7a and 7b and confirmed with the key 7c.

Thus, in the aligning mode, the desired cutting parameter 9 relative to the strip of labels 2a is displayed. The operator may now enter the desired cutting parameter 9 into the machine control unit 6 with the input unit 7 (cf. FIG. 1). Here, the operator may shift the desired cutting parameter 9 along the strip of labels with the arrow keys 7a and 7b such that it corresponds to the desired cutting position.

Subsequently, the machine control unit 6 may control the cutting device 4 via the control module 14 such that the cut is performed corresponding to the desired cutting parameter 9.

FIG. 3 shows a screen display during an automatic detection of the actual cutting parameter 10. It is automatically determined by the first image-processing unit 12a from the camera image of the position sensor 5 in the learning mode. For example, this is the edge of the label print or the center between two subsequent edges. Thereby, the operator is assisted in entering the desired cutting parameter 9 as quickly as possible.

One can see here that the actual cutting parameter 10 was calculated to be too far on the left side, and consequently, the operator may shift the actual cutting parameter 10 via the arrow keys 7a and 7b such that the desired cutting parameter 9 is reached. The actual cutting parameter 10 and the desired cutting parameter 9 may be represented in different colors and/or line types on the screen 8.

FIG. 4 shows a screen display after the detection of the cutting position 13 by the quality assurance unit 16. As was described with reference to FIG. 1, the quality assurance unit 16 automatically detects the cutting position 13 at the cut strip of labels 2c. This information is now represented on the screen 8 with respect to the yet uncut strip of labels 2a.

One can see that a distance A between the desired cutting parameter and the cutting position 13 results. This may be explained, for example, by a faulty calibration of the distance of the position sensor 5 to the cutting device 4, or by a maladjusted cutting device 4.

In the correction mode, the machine control unit 6 may now calculate and automatically correct the deviation of the desired cutting parameter 9 from the cutting position 13. By this, the corresponding calibration parameters in the machine control unit 6 may also be corrected. As an alternative, the operator may also manually correct the position of the desired cutting parameter 9 via the arrow keys 7a and 7b and moreover determine the deviation A in the correction mode.

The above-mentioned calibrations, parameters, camera images, actual cutting parameters and desired cutting parameters may be stored in the database 15 to retrieve the data at a later point in time and correspondingly evaluate them.

It will be understood that features mentioned in the above described embodiments are not restricted to these special combinations and are possible in any other combinations.

The invention claimed is:

1. A method for aligning a strip of labels having a plurality of labels relative to a cutting device, wherein the strip of labels is cut into labels by the cutting device that are subsequently applied to containers,
   in a learning mode,
      automatically transporting the strip of labels by a transport device, and
      detecting the position of the strip of labels relative to the cutting device by means of a position sensor embodied as a first camera,
      evaluating a camera image of the position sensor representing the strip of labels with a first image-processing unit,
      automatically detecting an actual cutting parameter for the cutting device providing a suggested cutting position relative to the strip of labels,
   and then in an aligning mode,
      displaying on a screen the camera image of the position sensor representing the strip of labels,
      displaying information indicative of the actual cutting parameter on the screen relative to the strip of labels,
      permitting an operator to enter a desired cutting parameter in a machine control unit by means of an input unit,
      displaying the desired cutting parameter as a line relative to the camera image representing the strip of labels to the operator on the screen, and
      controlling, via the machine control unit, the cutting device on the basis of the desired cutting parameter.

2. The method according to claim 1, and storing the desired cutting parameter in a database.

3. The method according to claim 1, and storing the actual cutting parameter in a database.

4. The method according to claim 1, and, then in a quality assurance mode, detecting the cut strip of labels via a quality assurance unit embodied as a second camera.

5. The method according to claim 4, and the quality assurance unit automatically detecting a cutting position at the cut strip of labels with the aid of a second image-processing unit and displaying information indicative of the cutting position on the screen relative to the cut strip of labels.

6. The method according to claim 5, and, then in a correction mode, the machine control unit automatically correcting a deviation of the desired cutting parameter from the cutting position.

7. The method according to claim 5, and storing the cutting position in a database.

8. A labeling machine for labeling containers, comprising:
a transport device for transporting a strip of labels with a plurality of labels,
a cutting unit for cutting the strip of labels,
a position sensor embodied as a first camera for detecting the position of the strip of labels relative to the cutting unit,
a machine control unit with a screen and an input unit,
the input unit is embodied to at least one of enter or correct a desired cutting parameter,
the screen is embodied to display a camera image of the position sensor representing the strip of labels and the desired cutting parameter as a line relative to the camera image representing the strip of labels, and a cutting position of the cutting unit is controllable by the machine control unit on the basis of the desired cutting parameter,
a quality assurance unit for detecting the cut strip of labels, wherein the quality assurance unit comprises a second camera, and
an image processing unit embodied to evaluate a cutting position from a camera image of the cut strip of labels.

9. The labeling machine according to claim 8, further comprising a first image-processing unit for evaluating the position of the strip of labels from a camera image of the position sensor, and wherein the image processing unit comprises a second image processing unit.

10. The labeling machine according to claim 9, wherein the first image-processing unit is embodied to detect transformation-invariant features of the plurality of labels.

11. The labeling machine according to claim 9, wherein the first image-processing unit is embodied to compare the camera image with a reference image.

* * * * *